United States Patent [19]

Martin

[11] 4,455,049

[45] Jun. 19, 1984

[54] LATCH ASSEMBLY

[75] Inventor: Brian D. Martin, Glasgow, Scotland

[73] Assignee: Ford Motor Company, Dearborn, Mich.

[21] Appl. No.: 314,091

[22] PCT Filed: Mar. 4, 1981

[86] PCT No.: PCT/GB81/00037

§ 371 Date: Oct. 16, 1981

§ 102(e) Date: Oct. 16, 1981

[87] PCT Pub. No.: WO81/02549

PCT Pub. Date: Sep. 17, 1981

[30] Foreign Application Priority Data

Mar. 5, 1980 [GB] United Kingdom ................. 8007487

[51] Int. Cl.³ ............................................. E05C 19/06

[52] U.S. Cl. ....................................... 297/379; 292/87

[58] Field of Search .................... 297/379; 292/76, 80, 292/81, 84, 87

[56] References Cited

U.S. PATENT DOCUMENTS

| | | | |
|---|---|---|---|
| 611,235 | 9/1898 | Cleaveland | 292/80 |
| 1,380,263 | 5/1921 | Stein | 292/87 X |
| 1,480,956 | 1/1924 | Robinson | 292/80 X |
| 1,573,368 | 2/1926 | Barnes | 292/76 |
| 3,210,776 | 10/1965 | Cox | 292/80 X |
| 3,719,379 | 3/1973 | Sigmund | 292/379 |
| 3,915,493 | 10/1975 | Brown | 292/87 X |
| 4,057,271 | 11/1977 | Colinet | 292/87 |

*Primary Examiner*—William E. Lyddane
*Attorney, Agent, or Firm*—John J. Roethel; Daniel M. Stock; Clifford L. Sadler

[57] ABSTRACT

A simple latch assembly suitable for a lifting seat cushion in a motor vehicle comprises a latch member (9) in the form of a wire having two lobes (14, 15) each extending approximately in radial planes from a common axis (16). One lobe (14) engages a catch (2); the other (15) can be manipulated. The ends (10, 11) of the wire are fixed at spaced points (12, 13) so that rotation of either lobe (14, 15) about the common axis displaces the other and generates a restoring force in the loop biasing the lobes towards their original positions.

5 Claims, 3 Drawing Figures

LATCH ASSEMBLY

DESCRIPTION

This invention relates to latch assemblies.

Latch assemblies are widely used throughout the motor vehicle manufacturing industry. In many instances, a simple, cheap and effective latch assembly is required. For example in a motor vehicle having a hinged rear seat cushion which can be lifted from its normal horizontal position to a vertical position, to provide room for the seat back to be folded down, it is desirable to provide a simple latch assembly for retaining the seat cushion in the horizontal position. Hitherto such latch assemblies have often been composed of a relatively large number of parts requiring a high number of forming operations.

According to the present invention there is provided a latch assembly comprising first and second members mounted for movement towards and away from each other, a catch on one of the members and a latch member on the other member releasably engagable with the catch to hold the two members together characterized in that the latch member comprises a wire shaped to define two lobes each extending approximately in a radial plane from a common axis, and in that the wire is fixed to the said one member at two spaced points so that rotation of either lobe about the common axis displaces the other lobe and generates a restoring force in the loop which biases the lobes towards their original position.

The use of a two-lobed wire as the latch member provides a very simple, cheap and yet effective mechanism, which can, for example, be used to retain a member such as a seat cushion in a folded down position. Thus, the wire can conveniently be so shaped that one lobe is directly engagable with the latch avoiding complicated linkages. Since access to the latch member will normally be from the rear when the seat back is folded down, the wire may be mounted on one side of the seat cushion, and an aperture may be provided in the seat cushion to allow access from the other side to one lobe of the wire for manipulation.

In the preferred embodiment of the invention, the wire is in the form of a loop, and the loop also has two free ends which extend approximately parallel to the common axis.

In order to allow the wire to be accommodated snugly within a member of square or rectangular box-section, the lobes of the wire are also preferably square or rectangular in cross-section. A preferred embodiment of the invention will now be described, by way of example only, with reference to the accompanying drawings, in which.

Figure 1:
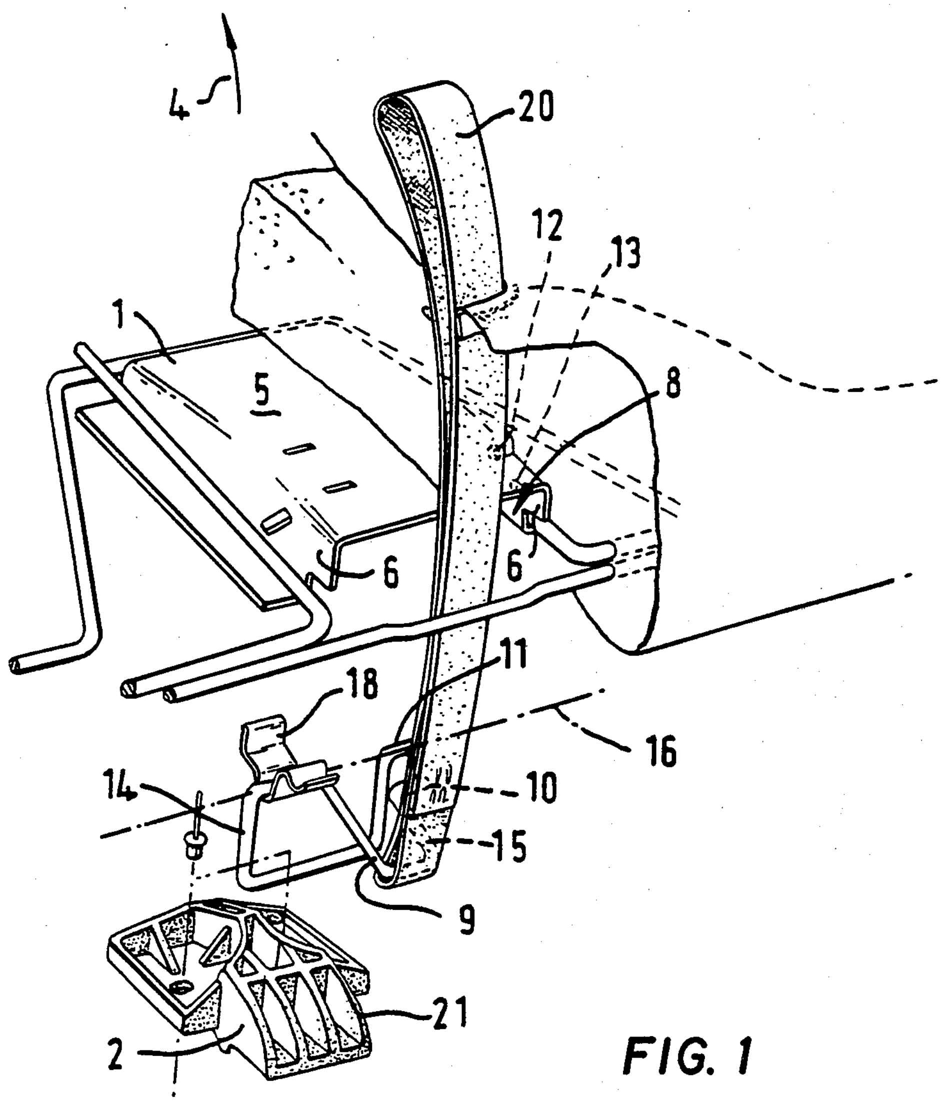
FIG. 1 is an "exploded" view of a seat cushion incorporating a latch assembly according to the invention.

Referring to the drawings, a latch assembly comprises a first member 1 which, in the present case is a strut attached to the frame of a folding rear seat cushion for a motor vehicle, and a catch 2 riveted on to a second member 3, which, in the present case, is the floor panel of a motor vehicle body. The rear seat cushion is hinged to the vehicle body along its front edge (not shown) so that the seat cushion can be raised from the position shown in the drawings, as indicated in the arrow 4.

The strut 1 comprises a top surface 5 and two side flanges 6, which define a space of generally rectangular cross-section within the strut 1. The front of the strut 1 defines a rectangular aperture 8.

A latch member 9 in the form of a bent rod of spring wire is mounted in the strut 1.

Figure 2:
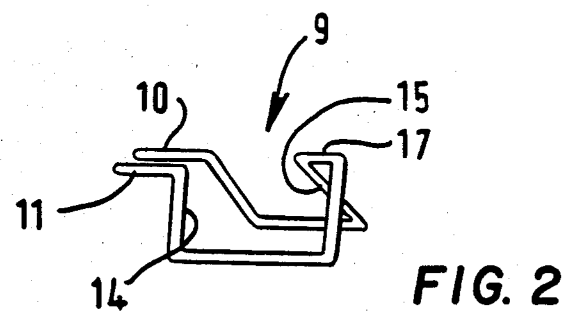
FIG. 2 is a perspective view of the latch member of the assembly of FIG. 1.
Figure 3:
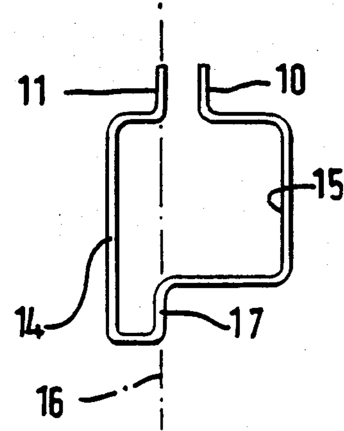
FIG. 3 is a plan thereof.

As best seen in FIG. 2, the latch member 9 comprises a loop of wire the two free ends 10, 11 of which are parallel to each other and located in similarly sized apertures 12, 13 in one flange 6 of the strut 1. The wire is bent to form two lobes 14, 15 of generally rectangular shape each of which lies approximately in a plane which extends radially from a common axis 16 (FIG. 2) and which is parallel to the axis of the free ends of the wire loop 9. The two lobes are of different sizes and are interconnected by a bridging portion 17 extending approximately along the common axis 16. The two planes in which the lobes 14, 15 lie are inclined to each other at an acute angle of about 75°, and the two lobes are received snugly within the rectangular cross-sectional area defined between the rear surface 5 and flanges 6 of the strut 1. A strap 20 passes around one of the lobes 15 through the aperture 8 to lie on the upper surface of the cushion. A spring clip 18 mounted in the strut 1 supports the latch member 9 by the bridging portion 17.

The latch member 9 is therefore pivotable between a normal position, illustrated in solid lines in FIG. 1 and a releasing position, by rotation of the lobes 14, 15 about the axis 16. Such rotation distorts the wire loop and therefore generates a restoring force in the loop which biases the lobes towards their normal position.

In the normal position of the latch member 9, one of the lobes 14 can engage the catch 2 and therefore holds the strut 1 against the floor panel 3.

The latch member 9 can be released by pulling the strap 20 to move the lobe 15 upwardly into the releasing position.

When the latch member is disengaged from the catch 2 and then released, it will snap back into its normal position under the influence of the force generated in the loop as a result of its distortion upon deflection out of its normal position.

When the strut 1 is moved towards the floor panel 3, with the latch member 9 in its normal position, the lobe 14 will engage with the sloping cam surface 21 on the catch 2 and will be deflected out of its normal position. As the cushion approaches the lowered position, the latch member 9 moves with engagement with the catch 2 to retain the strut 1 against the floor panel 1.

The embodiment of the invention described above therefore provides a very simple and effective latch mechanism, requiring a minimum number of working parts and forming operations.

I claim:

1. A latch assembly comprising first and second members mounted for movement towards and away from each other, a catch on one of the members and a latch member on the other member releasably engageable with the catch to hold the two members together characterized in that the latch member comprises a wire shaped to define two lobes, each extending approximately in a radial plane from a common axis and terminating in a free end of the wire extending approximately parallel to the common axis and in that the free ends of the wire are fixed to the said other member in two spaced apertures formed therein so that rotation of either lobe about the common axis displaces the other lobe and generates a restoring force in the loop which biases the lobes towards their original positions.

2. An assembly according to claim 1, wherein the lobes extend in two planes inclined to each other at an acute angle.

3. An assembly according to claim 1 or 2, wherein the lobes are generally square or rectangular.

4. An assembly according to claim 1, wherein one lobe is engageable directly with the catch.

5. An assembly according to claim 1, wherein the wire is mounted adjacent one side of the said other member and one lobe is accessible for manipulation from the other side of the member through an aperture in the said other member.

* * * * *